(12) United States Patent
Rocha et al.

(10) Patent No.: US 12,718,622 B2
(45) Date of Patent: Aug. 25, 2026

(54) SYSTEM FOR ASSIGNING ALIASES TO SIGNS AND OBJECTS IN VIDEO DATA

(71) Applicant: Lenovo (Singapore) Pte. Ltd., Singapore (SG)

(72) Inventors: Jampierre Vieira Rocha, Itambacuri (BR); Silvan Ferreira da Silva Junior, Parnamirim (BR); Jayne de Morais Silva, Campina Grande (BR); Guiherme de Magalhães Pupio, Sao Jose dos Campos (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 18/500,767

(22) Filed: Nov. 2, 2023

(65) Prior Publication Data

US 2025/0148831 A1 May 8, 2025

(51) Int. Cl.
*G06V 40/20* (2022.01)
*G06V 10/44* (2022.01)
*G06V 10/764* (2022.01)

(52) U.S. Cl.
CPC .............. *G06V 40/28* (2022.01); *G06V 10/44* (2022.01); *G06V 10/764* (2022.01)

(58) Field of Classification Search
CPC ...... G06V 40/20; G06V 40/28; G06V 10/764; G06V 40/107
See application file for complete search history.

(56) References Cited

U.S. PATENT DOCUMENTS

| | | | | |
|---|---|---|---|---|
| 10,768,708 | B1 * | 9/2020 | Sills | B25J 13/00 |
| 11,182,909 | B2 * | 11/2021 | Bazarevsky | G06T 7/251 |
| 11,836,299 | B1 * | 12/2023 | de Araujo Lima | G09B 21/009 |
| 12,443,269 | B2 * | 10/2025 | Furtwangler | G06F 3/011 |
| 12,444,060 | B2 * | 10/2025 | Bazarevsky | G06T 7/75 |
| 2011/0301934 | A1 * | 12/2011 | Tardif | G06F 40/45<br>382/103 |

(Continued)

FOREIGN PATENT DOCUMENTS

| | | | | |
|---|---|---|---|---|
| CN | 113936233 A | * | 1/2022 | G10L 15/22 |
| CN | 117930986 A | * | 4/2024 | G06V 40/28 |

(Continued)

OTHER PUBLICATIONS

Deixis, Anaphora and Highly Iconic Structures: Cross-linguistic Evidence on American (ASL), French(LSF) and Italian (LIS) Signed Languages (Year: 2011).*

(Continued)

*Primary Examiner* — Jennifer Mehmood
*Assistant Examiner* — Soumya Thomas
(74) *Attorney, Agent, or Firm* — Schwegman Lundberg & Woessner, P.A.

(57) ABSTRACT

A system receives an image that includes a person executing a sign. The system determines whether the sign is a sign of a sign language, the sign points to an object in the image, the sign indicates that the person wants to assign an alias to the sign of the sign language or the object in the image, and/or whether the sign uses the alias. After this determination, the system executes an action based on whether the sign comprises the sign of the sign language, the sign identifying the object in the image, the sign assigning the alias, or the sign using the alias.

18 Claims, 7 Drawing Sheets

(56) References Cited

U.S. PATENT DOCUMENTS

2013/0169536 A1* 7/2013 Wexler ................. G09B 21/008
345/158
2018/0232645 A1* 8/2018 Finkelstein ............... G01S 5/28
2018/0260680 A1* 9/2018 Finkelstein .............. G06N 5/04
2020/0019296 A1* 1/2020 Kodali .................... G06F 3/017
2022/0327961 A1* 10/2022 Kelly ...................... G06F 40/58
2023/0078183 A1* 3/2023 Wang ..................... G06V 40/28
715/863
2023/0394884 A1* 12/2023 Wang ...................... G06F 40/30
2024/0087245 A1* 3/2024 Goodrich ................ G06F 3/017
2024/0361835 A1* 10/2024 Hylak ..................... G06F 3/013
2024/0395063 A1* 11/2024 Sanctis ................... G01S 7/417
2025/0069443 A1* 2/2025 de Melo Dahia ...... G06V 40/28
2025/0078574 A1* 3/2025 Thomson ................ G06F 40/58
2025/0078575 A1* 3/2025 Magalhães ............. G06V 40/28
2025/0147594 A1* 5/2025 Inoue .................... G06F 3/0485
2025/0218223 A1* 7/2025 Zargari Khuzani ... G06V 40/28
2025/0308288 A1* 10/2025 Benha .................. G06V 10/764
2025/0312678 A1* 10/2025 Jimenez ............. A63B 24/0003
2025/0322696 A1* 10/2025 Yang .................... G06V 40/165

FOREIGN PATENT DOCUMENTS

EP 4471542 A1 * 12/2024 ............... G06T 5/50
WO WO-2014113507 A1 * 7/2014 .............. G06F 3/011
WO WO-2022194180 A1 * 9/2022 ............. G06V 40/28

OTHER PUBLICATIONS

Elena Antinoro Pizzuto, Paolo Rossini, Marie-Anne Sallandre, Erin Wilkinson. Deixis, Anaphora and Highly Iconic Structures: Cross-linguistic Evidence on American (ASL), French (LSF) and Italian (LIS) Signed Languages. TISLR9, Dec. 2006, Florianopolis, Brazil. pp. 475-495. hal-00617907 (Year: 2011).*

Janke, Vikki, et al., "Using the Hands to Represent Objects in Space: Gesture as a Substrate for Signed Language Acquisition", Frontiers in Psychology, 2017 (Year: 2017).*

* cited by examiner

SYSTEM FOR ASSIGNING ALIASES TO SIGNS AND OBJECTS IN VIDEO DATA

TECHNICAL FIELD

Embodiments described herein generally relate to the assigning of aliases to signs and objects in video data.

BACKGROUND

Sign languages, which are also known as signed languages, are languages that use a visual-manual modality to convey meaning instead of spoken words. Sign languages are expressed through manual articulation in combination with non-manual markers. Sign languages are full-fledged natural languages with their own grammar and lexicon. Sign languages are not universal and are usually not mutually intelligible, although there are similarities among different sign languages. Although signing is used primarily by the deaf and hard of hearing, it is also used by hearing individuals, such as those who are unable to physically speak, those who have trouble with oral language due to a disability or condition, and those with deaf family members.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Deixis is a linguistic element, used in communications including sign languages, that does not make sense by itself, so its function is to refer to a situation, a moment of enunciation or an interlocutor. It is an element that aims to locate a fact in time and space. An anaphora, which is a related construct, uses the deixis in order to avoid repetitions of terms during the construction of a sentence. Therefore, for example, when the linguistic element performs a pointing function it is a deictic element, and when it uses the already established information it is an anaphoric element. An embodiment uses these concepts for recognizing deictic elements to simplify or enable the use of anaphoric elements in sign languages in video data. That is, pointing to some element of a scene in the video data or making a sign and later returning to the already pointed out or signaled information.

Figure 1:
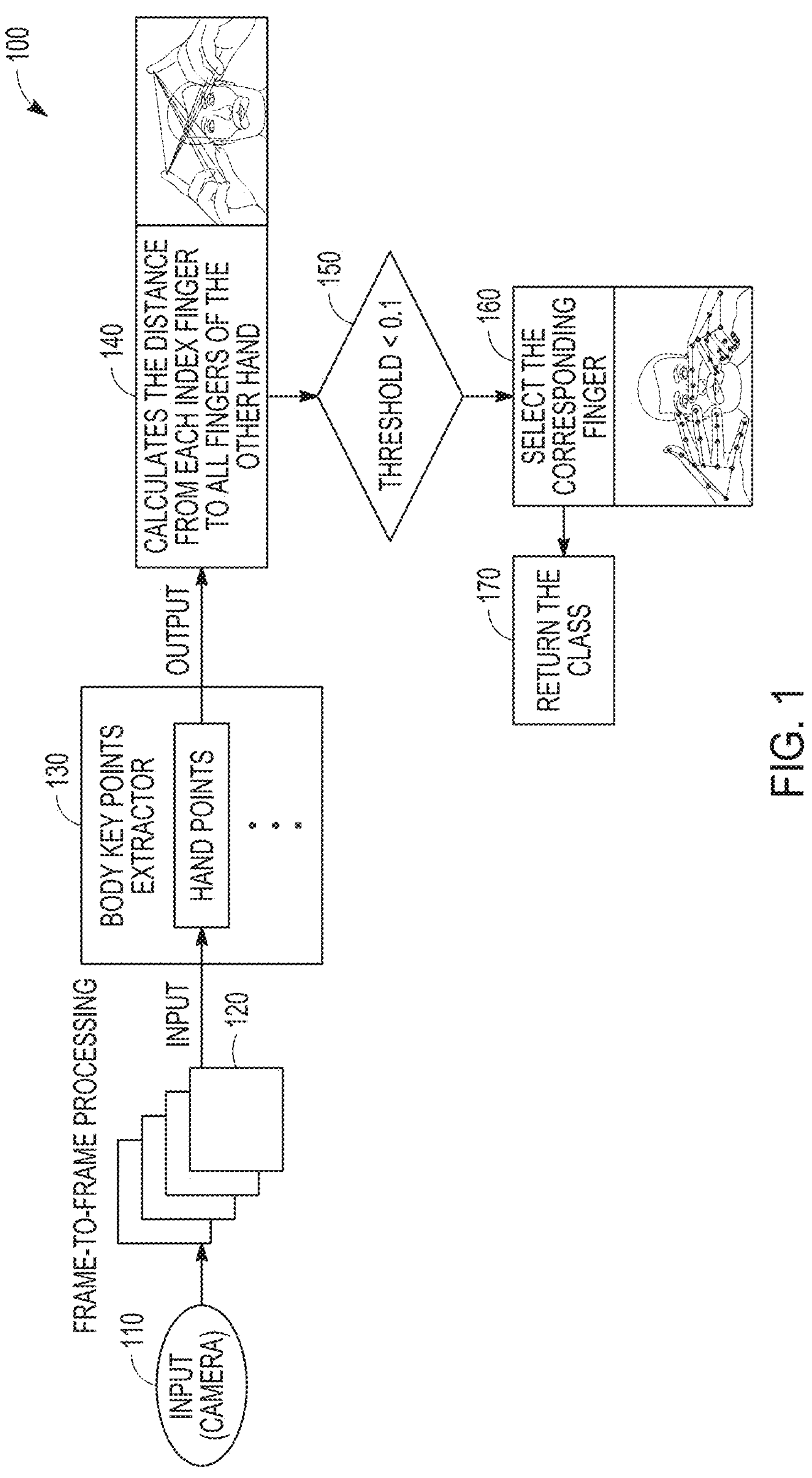
FIG. 1 is a block diagram of a process to recognize a selection of a finger in video data.

Referring first to FIG. 1, which is a block diagram of a process 100 to recognize a finger selection in video data, an input camera 110 receives input video data and a processor executes frame to frame processing at 120. The video data include a person executing a sign of a sign language. As discussed below, in addition to the sign being a sign in a formal sign language, the sign could also be a sign that points to an object in the image, a sign that indicates that the person wants to assign an alias to the sign of the sign language or an object in the image, or a sign indicating that the person is using the alias. In making these determinations, the system extracts hand keypoints using a body keypoint extractor 130.

Figure 2:
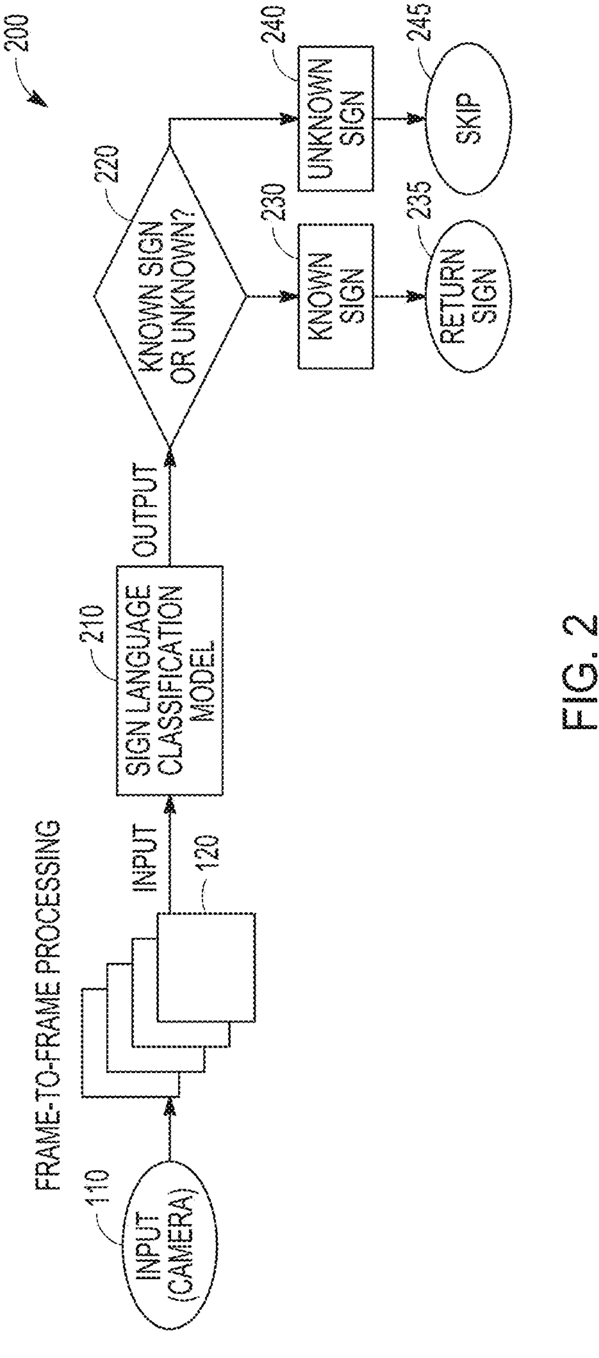
FIG. 2 is a block diagram of a process to recognize a sign in a sign language in video data.

Referring now to FIG. 2, which is a block diagram of a process 200 to recognize a sign in a sign language in video data, the system receives the video data from the input camera 110, and the video data are input into a sign language classification model 210. At 220, a determination is made whether the sign is a known sign of a sign language, or if the sign is not a known sign of a sign language. As indicated at 230, if it is a known sign, then at 235 the sign language model 210 returns the known sign for further processing. And as indicated at 240, if it is not a known sign, the sign or lack thereof is skipped at 245. If it is not a known sign of a sign language, it could be a pointing sign or an alias, which would then be processed as described below.

Figure 3:
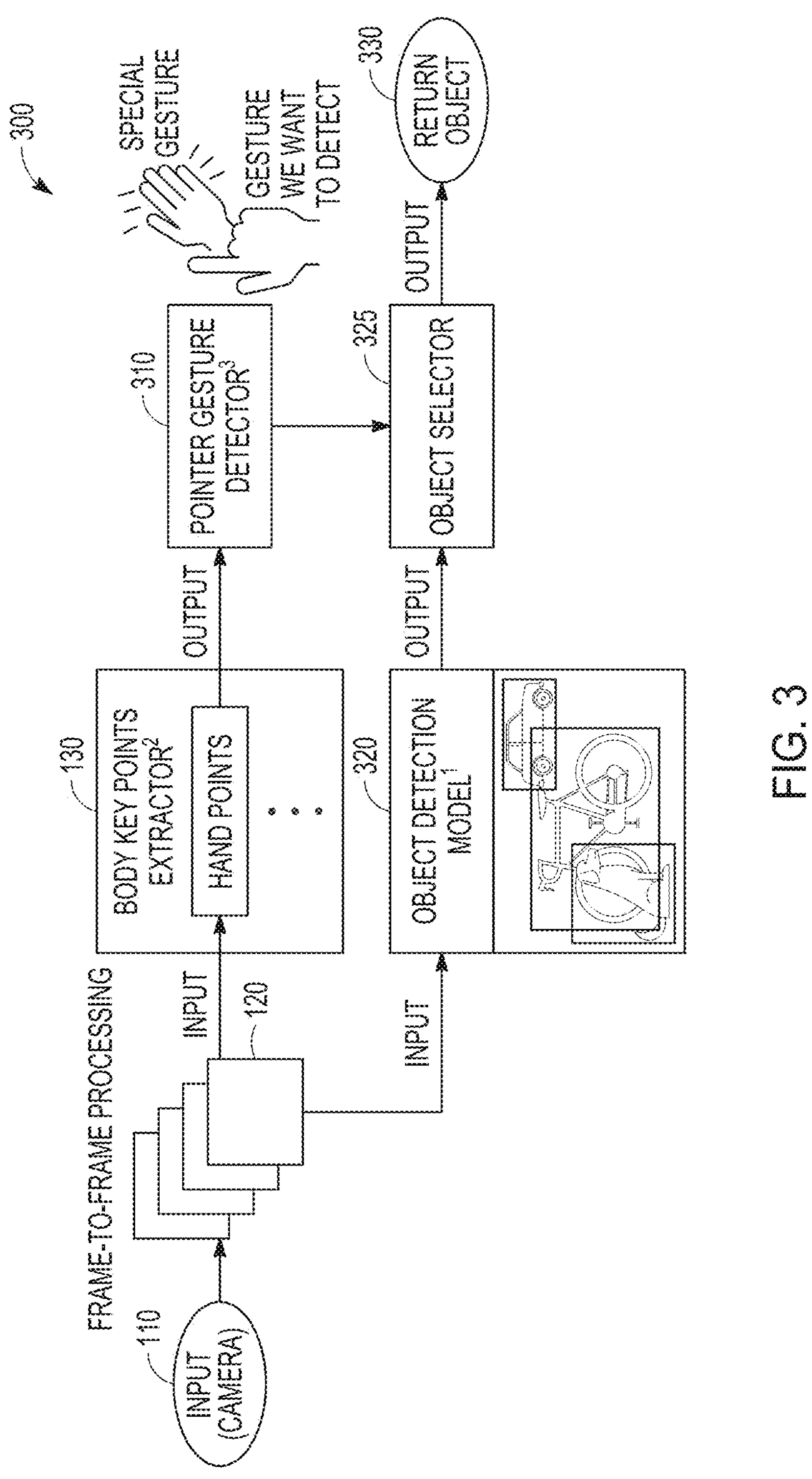
FIG. 3 is a block diagram of a process to detect an object in video data.

FIG. 3 is a block diagram of a process 300 to detect an object in video data. The input camera 110 once again receives video data. The video data are processed by the body keypoints extractor 130 to determine the hand keypoints of the person, and these keypoints are provided to a pointer gesture detector 310 to determine if the person is pointing to an object in the video data feed. Simultaneously, the process of FIG. 3 provides input to an object detection model 320, which detects one or more objects in the video data. Then, if a pointing gesture is detected by the pointer gesture detector 310 (by pointing to a bounding box surrounding an object in the video data), and an object is detected by the object detection model 320, then at 325 the object that is being pointed to by the person is selected at 325, and the object is returned at 330 for the assigning of an alias.

Figure 4:
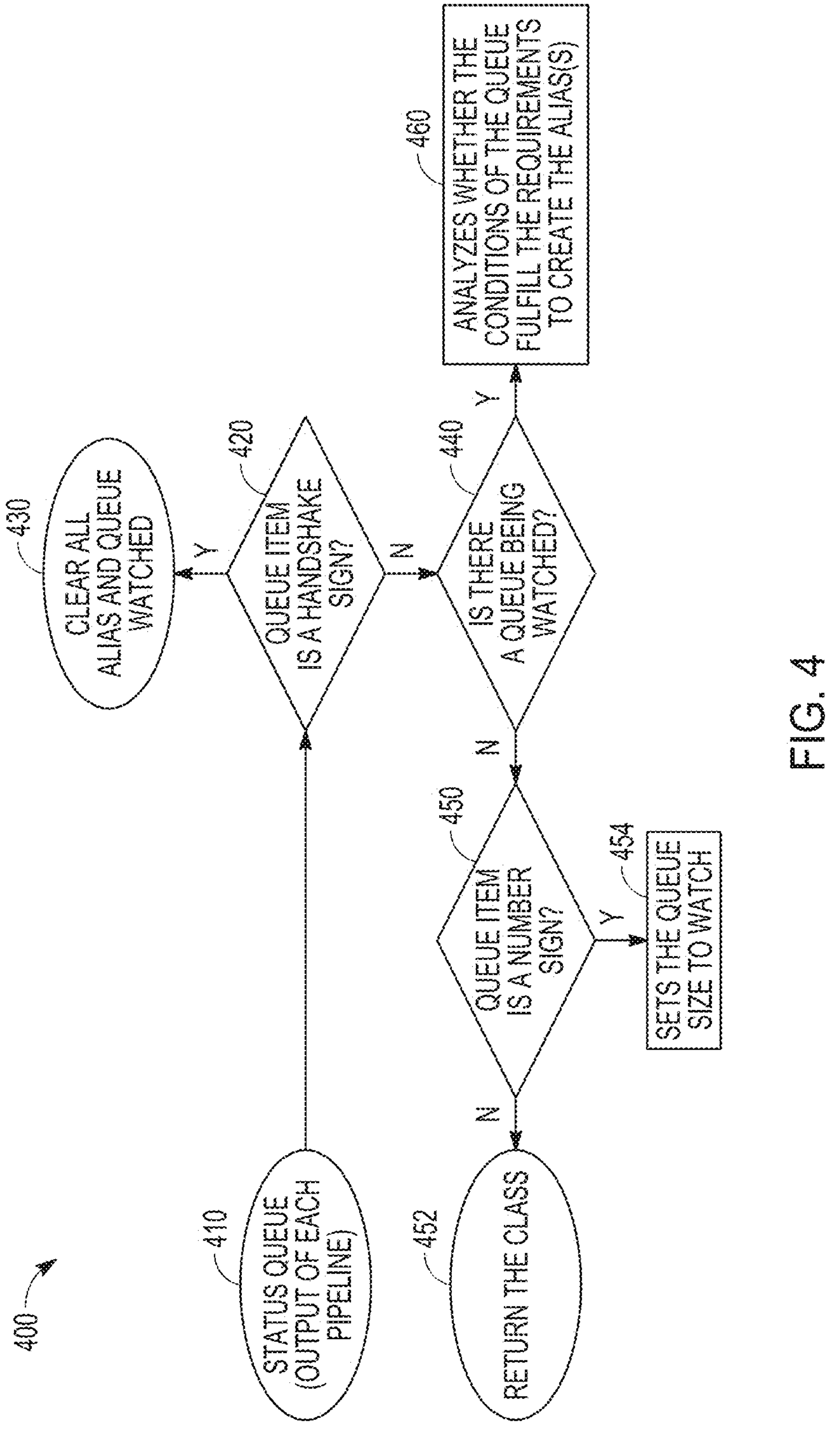
FIG. 4 is a block diagram of processing a workflow queue.

FIG. 4 is a block diagram of a process 400 for processing a workflow queue. A status queue 410 contains the output of each pipeline, that is, the determination that a sign is a known sign of a sign language, the sign is pointing to an object in the image data, the sign indicates that the person wants to assign an alias to a known sign or an object in the video data, or the person wants to use an alias. At 420, the system determines whether the sign detected in the video data indicates that the person wants to clear any alias presently in the queue. For example, such a sign could be a simple shaking of the person's hand in an up and down fashion (like he or she is trying to shake something off their hand). If there is such a sign, then the aliases are cleared at 430. Otherwise, at 440, the system determines if there is a queue being monitored. If there is, then at 460 the system analyzes whether the conditions of the queue fulfill the requirements to create the aliases. If there is not a queue being watched, then at 450 the system determines if a current queue item is a number sign. If it is, then the system sets that queue size to that number at 454, otherwise the class of the object or sign is returned at 452.

Figure 5A:
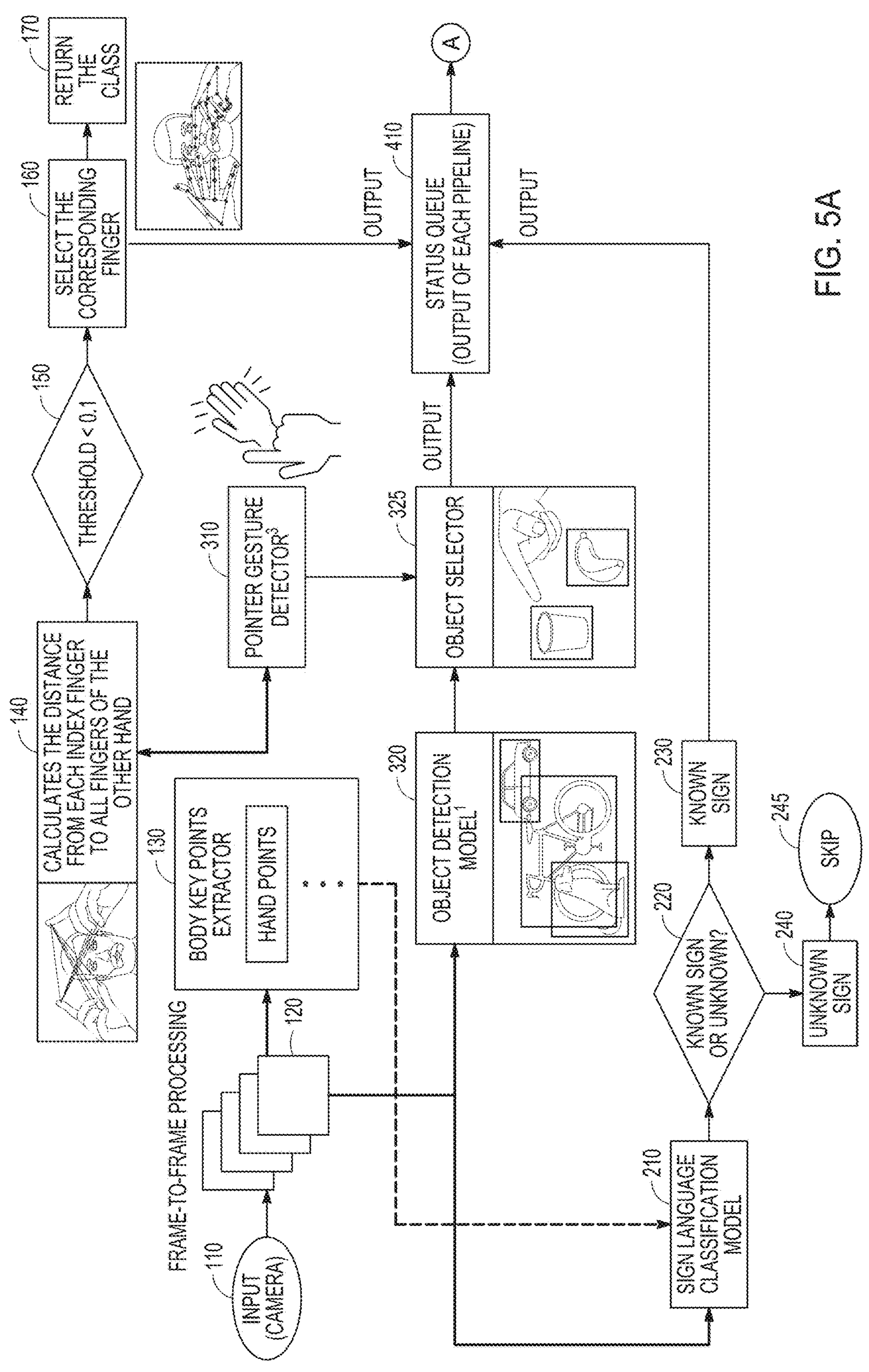
FIGS. 5A and 5B are a block diagram of a process of assigning a temporary sign or alias in video data and using that temporary sign or alias.
Figure 5B:
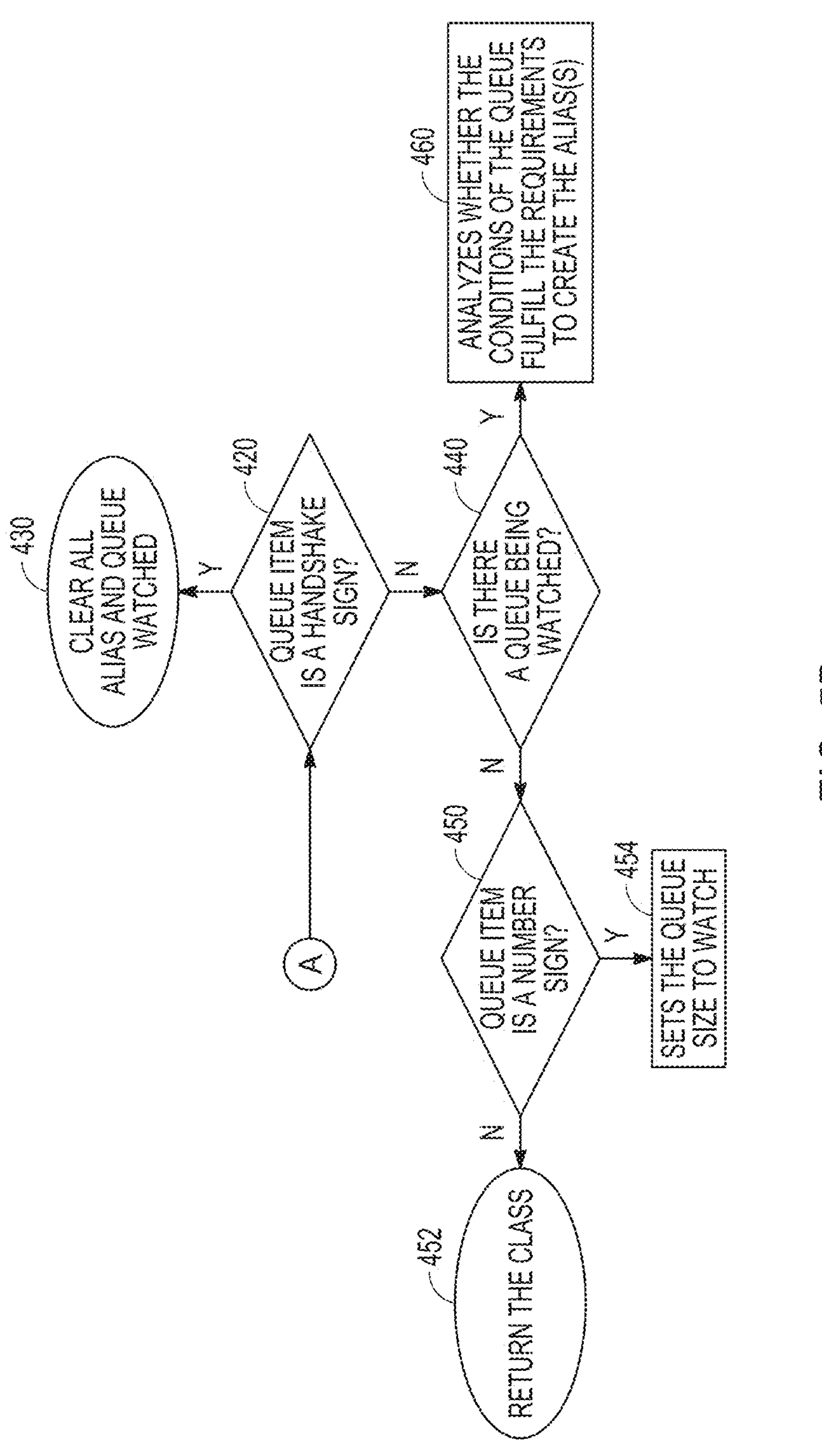

FIGS. 5A and 5B are a block diagram of a process of assigning a temporary sign or alias in video data, and it basically encompasses all the operations and features of FIGS. 1, 2, 3 and 4 in a combined fashion. An image or image data are received from input camera 110. The image includes a person executing a sign using one or more hands of the person. Processing begins at frame-to-frame processing 120, and the processing includes three primary branches.

A first branch includes determining whether the sign is a sign of a sign language by providing the image to a sign language classification model 210. As indicated above in connection with FIG. 2, a determination is made at 220 whether the image includes a known sign or not. If the image contains no known sign at 240, the image is skipped over at 245. If it is determined at 230 that the image includes a known sign, the image is added to the status queue at 410.

A second branch determines whether the image includes a sign that points to an object in the image via object detection model 320, and further whether pointer gesture detector 310 points to an object in the image recognized by the object detection model 320. If a pointer gesture is detected at 310, and an object which is pointed to is detected at 320, then that object is selected at 325, and this identified object is provided to the status queue at 410.

A third branch determines whether the sign indicates that the person wants to assign an alias to the sign of the sign language or the object in the image. Beginning at 140, distances from both index fingers to each finger of the opposing hand are calculated. This can be accomplished using a program such as Mediapipe. If a distance is less than a threshold at 150, for example less than a centimeter, the finger pointed to by the index finger is selected at 160, and the class is returned at 170. If there are more than one instance of distances that are less than the threshold, the system takes the smallest distance and changes the frame class to the corresponding finger with the smallest distance, then, the class of the last sorted frame is returned. This selected finger can be in connection with assigning an alias to a sign or an object, or in connection with using the alias. The information regarding the selected finger is then placed into the status queue at 410. The status queue is then processed as was discussed in connection with FIG. 4.

At this point, the items in the status queue are processed. Referring to FIG. 5B, at 420 it is determined if the next item in the status queue is a sign to clear one or more aliases. If it is, the aliases are cleared at 430. It is noted that a clearing sign could be a shaking of the hand, such as if the person was trying to shake off something from his or her hand. If it is not a clearing sign, then at 440 it is determined if a queue is being watched. If it is, then at 460 the system analyzes whether the conditions in the queue fulfill the requirements to create the aliases. If a queue is not being watched, then at 450, it is determined if the queued item is a number sign. If it is, then at 454 the process sets the queue size to watch. If it is not, then a class of an object or sign is returned at 452.

In summary, the operations of FIGS. 5A and 5B execute an action based on whether the sign is a sign of a sign language, the sign identifies an object in the image, the sign assigns an alias to a known sign language sign or an object in the image, or the sign is using the alias.

Figure 6:
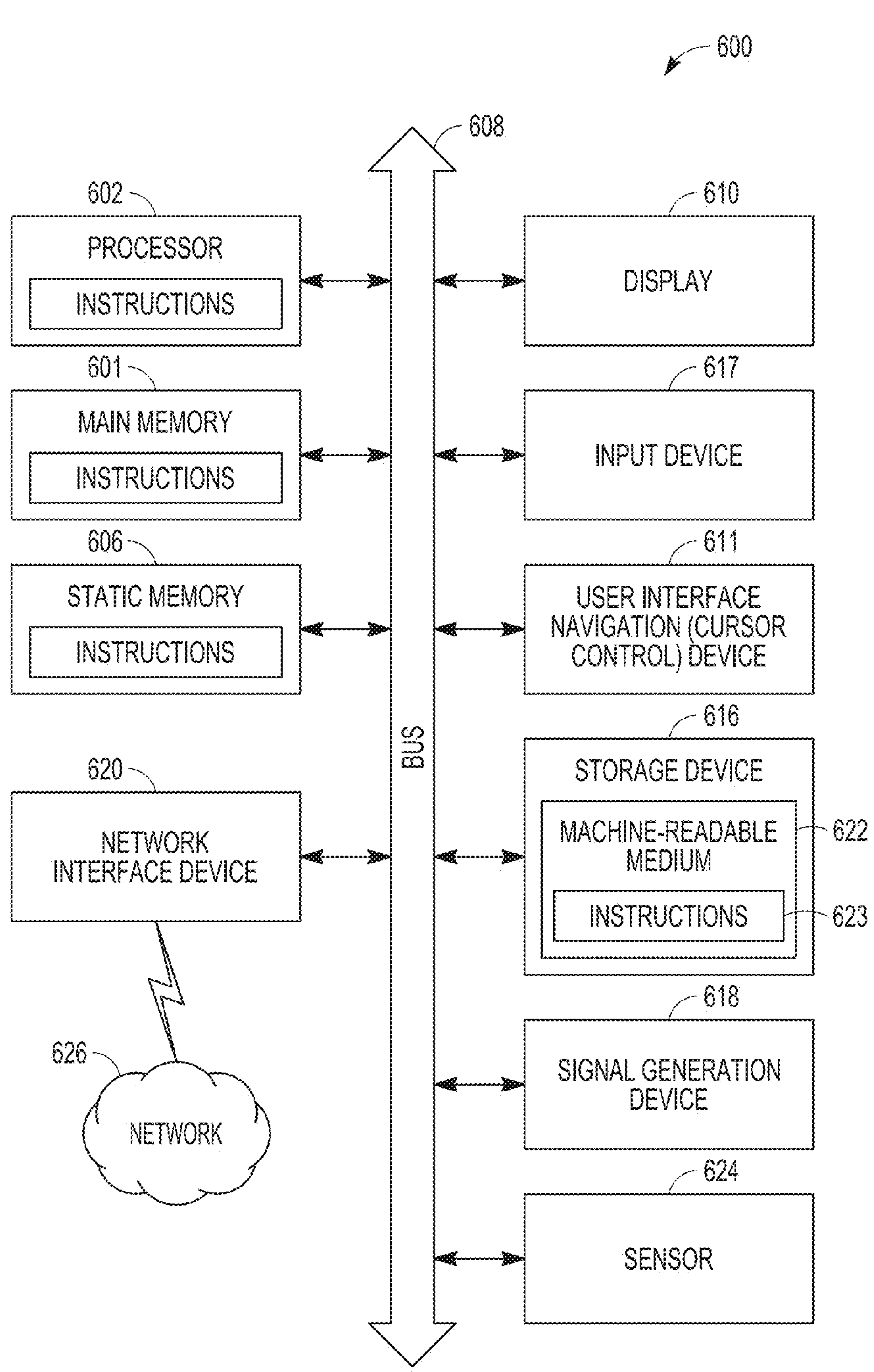
FIG. 6 is a block diagram of a computer architecture upon which one or more disclosed embodiments can execute.

FIG. 6 is a block diagram illustrating a computing and communications platform 600 in the example form of a general-purpose machine on which some or all the operations of FIGS. 1, 2, 3, 4, 5A and 5B may be carried out according to various embodiments. In certain embodiments, programming of the computing platform 600 according to one or more particular algorithms produces a special-purpose machine upon execution of that programming. In a networked deployment, the computing platform 600 may operate in the capacity of either a server or a client machine in server-client network environments, or it may act as a peer machine in peer-to-peer (or distributed) network environments.

Example computing platform 600 includes at least one processor 602 (e.g., a central processing unit (CPU), a graphics processing unit (GPU) or both, processor cores, compute nodes, etc.), a main memory 601 and a static memory 606, which communicate with each other via a link 608 (e.g., bus). The computing platform 600 may further include a video display unit 610, input devices 617 (e.g., a keyboard, camera, microphone), and a user interface (UI) navigation device 611 (e.g., mouse, touchscreen). The computing platform 600 may additionally include a storage device 616 (e.g., a drive unit), a signal generation device 618 (e.g., a speaker), a sensor 624, and a network interface device 620 coupled to a network 626.

The storage device 616 includes a non-transitory machine-readable medium 622 on which is stored one or more sets of data structures and instructions 623 (e.g., software) embodying or utilized by any one or more of the methodologies or functions described herein. The instructions 623 may also reside, completely or at least partially, within the main memory 601, static memory 606, and/or within the processor 602 during execution thereof by the computing platform 600, with the main memory 601, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 623. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process comprising receiving into a computer processor an image from an image sensing device, the image comprising a person executing a sign using one or more hands of the person; determining whether the sign is a sign of a sign language; determining whether the sign points to an object in the image; determining whether the sign indicates that the person wants to assign an alias to the sign of the sign language or the object in the image; determining whether the sign uses the alias; and executing an action based on whether the sign comprises the sign of the sign language, the sign identifying the object in the image, the sign assigning the alias, or the sign using the alias.

Example No. 2 includes all the features of Example No. 1, and optionally includes a process wherein an output of the determinations of whether the sign comprises a sign of the sign language, the sign identifying the object, the sign assigning the alias, or the sign using the alias, is placed into a queue for further processing.

Example No. 3 includes all the features of Example Nos. 1-2, and optionally includes a process wherein the determination of whether the sign comprises the sign of the sign language, the sign identifying the object, the sign assigning the alias, or the sign using the alias, uses a keypoint extractor module to extract keypoints on the one or more hands of the person.

Example No. 4 includes all the features of Example Nos. 1-3, and optionally includes a process wherein the determining whether the sign is a sign of a sign language comprises using a sign classification model.

Example No. 5 includes all the features of Example Nos. 1-4, and optionally includes a process wherein the determining that the person wants to assign the alias to the sign of the sign language comprises receiving the sign of the sign language, determining a distance between a first finger of a first hand of the person and a distance between a second finger of a second hand of the person, determining that the distance is less than a threshold, and assigning the second finger as the alias.

Example No. 6 includes all the features of Example Nos. 1-5, and optionally includes a process wherein the determining whether the sign points to an object in the image comprises identifying the sign as a pointing gesture, identifying the object in the image pointed to by the pointing gesture, and assigning the alias to the object.

Example No. 7 includes all the features of Example Nos. 1-6, and optionally includes a process wherein the assigning the alias to the object comprises receiving from the person a pointing of a first finger on a first hand to a second finger on a second hand, and assigning the alias to the second finger on the second hand.

Example No. 8 includes all the features of Example Nos. 1-7, and optionally includes a process wherein the determining whether the sign uses the alias comprises determining a distance between a first finger of a first hand of the person and a distance between a second finger of a second hand of the person, determining that the distance is less than a threshold, and recognizing the second finger as the alias.

Example No. 9 includes all the features of Example Nos. 1-8, and optionally includes a process comprising receiving a clearing sign, the clearing sign causing a clearing of one or more aliases.

Example No. 10 includes all the features of Example Nos. 1-9, and optionally includes a process comprising receiving a plurality of signs after an assigning of the alias to the sign of the sign language or the object in the image; and maintaining the alias.

Example No. 11 is a machine-readable medium comprising instructions that when executed by a processor execute a process comprising receiving into a computer processor an image from an image sensing device, the image comprising a person executing a sign using one or more hands of the person; determining whether the sign is a sign of a sign language; determining whether the sign points to an object in the image; determining whether the sign indicates that the person wants to assign an alias to the sign of the sign language or the object in the image; determining whether the sign uses the alias; and executing an action based on whether the sign comprises the sign of the sign language, the sign identifying the object in the image, the sign assigning the alias, or the sign using the alias.

Example No. 12 includes all the features of Example No. 11, and optionally includes a machine readable medium wherein an output of the determinations of whether the sign comprises a sign of the sign language, the sign identifying the object, the sign assigning the alias, or the sign using the alias, is placed into a queue for further processing.

Example No. 13 includes all the features of Example Nos. 11-12, and optionally includes a machine-readable medium wherein the determination of whether the sign comprises the sign of the sign language, the sign identifying the object, the sign assigning the alias, or the sign using the alias, uses a keypoint extractor module to extract keypoints on the one or more hands of the person.

Example No. 14 includes all the features of Example Nos. 11-13, and optionally includes a machine-readable medium wherein the determining that the person wants to assign the alias to the sign of the sign language comprises receiving the sign of the sign language, determining a distance between a first finger of a first hand of the person and a distance between a second finger of a second hand of the person, determining that the distance is less than a threshold, and assigning the second finger as the alias.

Example No. 15 includes all the features of Example Nos. 11-14, and optionally includes a machine-readable medium wherein the determining whether the sign points to an object in the image comprises identifying the sign as a pointing gesture, identifying the object in the image pointed to by the pointing gesture, and assigning the alias to the object; and wherein the assigning the alias to the object comprises receiving from the person a pointing of a first finger on a first hand to a second finger on a second hand, and assigning the alias to the second finger on the second hand.

Example No. 16 includes all the features of Example Nos. 11-15, and optionally includes a machine-readable medium wherein the determining whether the sign uses the alias comprises determining a distance between a first finger of a first hand of the person and a distance between a second finger of a second hand of the person, determining that the distance is less than a threshold, and recognizing the second finger as the alias.

Example No. 17 includes all the features of Example Nos. 11-16, and optionally includes a machine-readable medium comprising instructions for receiving a clearing sign, the clearing sign causing a clearing of one or more aliases.

Example No. 18 includes all the features of Example Nos. 11-17, and optionally includes a machine-readable medium comprising instructions for receiving a plurality of signs after an assigning of the alias to the sign of the sign language or the object in the image; and maintaining the alias.

Example No. 19 is a system comprising a computer processor; and a memory coupled to the computer processor; wherein the computer processor and memory are operable for receiving into the computer processor an image from an image sensing device, the image comprising a person executing a sign using one or more hands of the person; determining whether the sign is a sign of a sign language; determining whether the sign points to an object in the image; determining whether the sign indicates that the person wants to assign an alias to the sign of the sign language or the object in the image; determining whether the sign uses the alias; and executing an action based on whether the sign comprises the sign of the sign language, the sign identifying the object in the image, the sign assigning the alias, or the sign using the alias.

Example No. 20 includes all the features of Example No. 19, and optionally includes a system wherein an output of the determinations of whether the sign comprises a sign of the sign language, the sign identifying the object, the sign assigning the alias, or the sign using the alias, is placed into a queue for further processing.

The invention claimed is:

1. A computerized process comprising:

receiving into a computer processor an image from an image sensing device, the image comprising a person executing a sign using one or more hands of the person;

determining whether the sign is a sign of a sign language;

determining whether the sign points to an object in the image;

determining whether the sign indicates that the person wants to assign an alias to the sign of the sign language or the object in the image;

determining whether; a sign detected in a subsequent image received by from the image sensing device uses the alias, and executing an action based on whether the sign comprises the sign of the sign language, the sign identifying the object in the image, the sign assigning the alias, or the sign using the alias;

wherein the determining that the person wants to assign the alias comprises receiving the sign of the sign language, determining a distance between a first finger of a first hand of the person and a second finger of a second hand of the person, determining that the distance is less than a threshold, and assigning the second finger as the alias.

2. The computerized process of claim 1, wherein an output of the determinations of whether the sign comprises a sign of the sign language, the sign identifying the object, the sign assigning the alias, or the sign using the alias, is placed into a queue for further processing.

3. The computerized process of claim 1, wherein the determination of whether the sign comprises the sign of the sign language, the sign identifying the object, the sign assigning the alias, or the sign using the alias, uses a keypoint extractor module to extract keypoints on the one or more hands of the person.

4. The computerized process of claim 1, wherein the determining whether the sign is a sign of a sign language comprises using a sign classification model.

5. The computerized process of claim 1, wherein the determining whether the sign points to an object in the image comprises identifying the sign as a pointing gesture, identifying the object in the image pointed to by the pointing gesture, and assigning the alias to the object.

6. The computerized process of claim 5, wherein the assigning the alias to the object comprises receiving from the person a pointing of a first finger on a first hand to a second finger on a second hand, and assigning the alias to the second finger on the second hand.

7. The computerized process of claim 1, wherein the determining whether the sign uses the alias comprises determining a distance between a first finger of a first hand of the person and a second finger of a second hand of the person, determining that the distance is less than a threshold, and recognizing the second finger as the alias.

8. The computerized process of claim 1, comprising receiving a clearing sign, the clearing sign causing a clearing of one or more aliases.

9. The computerized process of claim 1, comprising receiving a plurality of signs after an assigning of the alias to the sign of the sign language or the object in the image; and maintaining the alias.

10. A non-transitory machine-readable medium comprising instructions that when executed by a processor execute a process comprising:

receiving into a computer processor an image from an image sensing device, the image comprising a person executing a sign using one or more hands of the person;

determining whether the sign is a sign of a sign language;

determining whether the sign points to an object in the image;

determining whether the sign indicates that the person wants to assign an alias to the sign of the sign language or the object in the image;

determining whether; a sign detected in a subsequent image received by from the image sensing device uses the alias; and executing an action based on whether the sign comprises the sign of the sign language, the sign identifying the object in the image, the sign assigning the alias, or the sign using the alias;

wherein the determining that the person wants to assign the alias comprises receiving the sign of the sign language, determining a distance between a first finger of a first hand of the person and a second finger of a second hand of the person, determining that the distance is less than a threshold, and assigning the second finger as the alias.

11. The non-transitory machine-readable medium of claim 10, wherein an output of the determinations of whether the sign comprises a sign of the sign language, the sign identifying the object, the sign assigning the alias, or the sign using the alias, is placed into a queue for further processing.

12. The non-transitory machine-readable medium of claim 10, wherein the determination of whether the sign comprises the sign of the sign language, the sign identifying the object, the sign assigning the alias, or the sign using the alias, uses a keypoint extractor module to extract keypoints on the one or more hands of the person.

13. The non-transitory machine-readable medium of claim 10, wherein the determining whether the sign points to an object in the image comprises identifying the sign as a pointing gesture, identifying the object in the image pointed to by the pointing gesture, and assigning the alias to the object; and wherein the assigning the alias to the object comprises receiving from the person a pointing of a first finger on a first hand to a second finger on a second hand, and assigning the alias to the second finger on the second hand.

14. The non-transitory machine-readable medium of claim 10, wherein the determining whether the sign uses the alias comprises determining a distance between a first finger of a first hand of the person and a second finger of a second hand of the person, determining that the distance is less than a threshold, and recognizing the second finger as the alias.

15. The non-transitory machine-readable medium of claim 10, comprising instructions for receiving a clearing sign, the clearing sign causing a clearing of one or more aliases.

16. The non-transitory machine-readable medium of claim 10, comprising instructions for receiving a plurality of signs after an assigning of the alias to the sign of the sign language or the object in the image; and maintaining the alias.

17. A system comprising:

a computer processor; and a memory coupled to the computer processor;

wherein the computer processor and memory are operable for:

receiving into the computer processor an image from an image sensing device, the image comprising a person executing a sign using one or more hands of the person;

determining whether the sign is a sign of a sign language;

determining whether the sign points to an object in the image;

determining whether the sign indicates that the person wants to assign an alias to the sign of the sign language or the object in the image;

determining whether; a sign detected in a subsequent image received by from the image sensing device uses the alias; and executing an action based on whether the sign comprises the sign of the sign language, the sign identifying the object in the image, the sign assigning the alias, or the sign using the alias;

wherein the determining that the person wants to assign the alias comprises receiving the sign of the sign language, determining a distance between a first finger of a first hand of the person and a second finger of a second hand of the person, determining that the distance is less than a threshold, and assigning the second finger as the alias.

18. The system of claim 17, wherein an output of the determinations of whether the sign comprises a sign of the sign language, the sign identifying the object, the sign assigning the alias, or the sign using the alias, is placed into a queue for further processing.

* * * * *